(12) United States Patent
Roβkamp et al.

(10) Patent No.: US 8,869,912 B2
(45) Date of Patent: *Oct. 28, 2014

(54) ELECTRIC POWER TOOL WITH BATTERY PACK

(75) Inventors: Heiko Roβkamp, Adelberg (DE);
Harald Mang, Winnenden (DE);
Matthias Müller, Remshalden (DE);
Volker Reber, Michelbach (DE); Georg Heinzelmann, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 218 days.

This patent is subject to a terminal disclaimer.

(21) Appl. No.: 12/709,717

(22) Filed: Feb. 22, 2010

(65) Prior Publication Data
US 2010/0218967 A1  Sep. 2, 2010

(30) Foreign Application Priority Data

Feb. 27, 2009  (DE) .......................... 10 2009 012 175

(51) Int. Cl.
| | | |
|---|---|---|
| *E21B 3/00* | (2006.01) | |
| *E21B 17/22* | (2006.01) | |
| *E21B 19/16* | (2006.01) | |
| *E21B 19/18* | (2006.01) | |
| *B25F 5/02* | (2006.01) | |
| *A01G 3/053* | (2006.01) | |
| *H01M 2/10* | (2006.01) | |

(52) U.S. Cl.
CPC . *B25F 5/02* (2013.01); *A01G 3/053* (2013.01); *H01M 2/1055* (2013.01)
USPC ........................................................ 173/217

(58) Field of Classification Search
USPC ................... 173/170–171, 217; 30/167–321, 30/369–394
See application file for complete search history.

(56) References Cited

U.S. PATENT DOCUMENTS

| | | | | |
|---|---|---|---|---|
| 3,212,188 | A * | 10/1965 | Riley, Jr. et al. | 30/216 |
| 3,337,954 | A * | 8/1967 | Robison | 30/277.4 |
| 3,442,240 | A * | 5/1969 | Loughman et al. | 114/315 |
| 3,664,021 | A * | 5/1972 | Sawyer | 30/277.4 |
| 3,759,020 | A * | 9/1973 | Simmons | 56/17.5 |
| 3,883,789 | A * | 5/1975 | Achenbach et al. | 429/9 |
| 3,973,179 | A * | 8/1976 | Weber et al. | 320/113 |

(Continued)

FOREIGN PATENT DOCUMENTS

| | | | |
|---|---|---|---|
| CN | 2 882 922 Y | 3/2007 | |
| DE | 38 39 840 A1 | 5/1990 | |
| DE | 102007017980 A1 * | 10/2008 | ............ H01M 2/10 |
| JP | H103895 A | 1/1998 | |

*Primary Examiner* — Robert Long
(74) *Attorney, Agent, or Firm* — Gudrun E. Huckett

(57) ABSTRACT

An electric power tool has a device housing with a rear grip extending in the longitudinal direction of the device housing. The device housing has first opposed housing sides and second opposed housing sides. An electric drive motor and its electronic control are arranged in the device housing. A battery pack compartment arranged in the device housing receives a battery pack that has a parallelepipedal shape and extends in a direction of a height axis, width axis and depth axis. The battery pack is arranged such that the width axis and the height axis extend transversely to the longitudinal axis of the device housing. The battery pack has narrow sides extending approximately parallel and at a minimal spacing relative to the first opposed housing sides, respectively. The battery pack has opposed end faces neighboring the second housing sides, respectively.

23 Claims, 4 Drawing Sheets

(56) References Cited

U.S. PATENT DOCUMENTS

| | | | |
|---|---|---|---|
| 4,050,003 A | 9/1977 | Owings et al. | |
| 4,160,857 A * | 7/1979 | Nardella et al. | 429/97 |
| 4,514,477 A * | 4/1985 | Kobayashi | 429/98 |
| 4,555,849 A | 12/1985 | Ando et al. | |
| 4,817,065 A * | 3/1989 | Usui et al. | 368/62 |
| 4,986,369 A * | 1/1991 | Fushiya et al. | 173/178 |
| 5,009,222 A * | 4/1991 | Her | 601/71 |
| 5,054,563 A | 10/1991 | Zapf | |
| 5,208,525 A * | 5/1993 | Lopic et al. | 320/112 |
| 5,465,801 A * | 11/1995 | Hoover | 180/19.1 |
| 5,553,675 A * | 9/1996 | Pitzen et al. | 173/217 |
| 5,626,979 A * | 5/1997 | Mitsui et al. | 429/97 |
| 5,671,815 A | 9/1997 | Kabatnik et al. | |
| 6,181,032 B1 | 1/2001 | Marschall et al. | |
| 6,329,788 B1 * | 12/2001 | Bailey et al. | 320/114 |
| 6,341,425 B1 * | 1/2002 | Kahle | 30/277.4 |
| 6,515,451 B2 * | 2/2003 | Watson et al. | 320/117 |
| 6,598,992 B1 * | 7/2003 | Ames | 362/138 |
| 6,692,864 B1 | 2/2004 | Dansui et al. | |
| 6,976,313 B2 * | 12/2005 | Wong | 30/369 |
| 7,011,668 B2 * | 3/2006 | Sancoff et al. | 606/148 |
| 7,117,966 B2 * | 10/2006 | Kohda et al. | 180/68.5 |
| 7,178,244 B2 * | 2/2007 | Fossella | 30/162 |
| 7,604,078 B2 * | 10/2009 | Okamoto et al. | 180/206.1 |
| 7,700,897 B2 * | 4/2010 | Chou et al. | 219/243 |
| 7,958,642 B2 * | 6/2011 | Rosskamp | 30/392 |
| 2004/0098869 A1 | 5/2004 | Ashfield | |
| 2005/0121209 A1 | 6/2005 | Shimizu et al. | |
| 2005/0194928 A1 * | 9/2005 | Hou | 320/114 |
| 2007/0139915 A1 * | 6/2007 | Walters | 362/158 |
| 2007/0245575 A1 | 10/2007 | Rosskamp | 30/392 |
| 2008/0216458 A1 * | 9/2008 | Lucas et al. | 56/10.6 |
| 2009/0240245 A1 * | 9/2009 | Deville et al. | 606/33 |
| 2010/0067222 A1 * | 3/2010 | Yu | 362/158 |
| 2010/0218386 A1 * | 9/2010 | Rokamp et al. | 30/277.4 |
| 2010/0221594 A1 * | 9/2010 | Rokamp et al. | 429/100 |
| 2011/0094762 A1 * | 4/2011 | Liebhard | 173/20 |
| 2011/0139479 A1 * | 6/2011 | Nagasaka et al. | 173/217 |
| 2011/0203119 A1 * | 8/2011 | Rosskamp | 30/277.4 |
| 2011/0308831 A1 * | 12/2011 | Martinsson et al. | 173/217 |

* cited by examiner

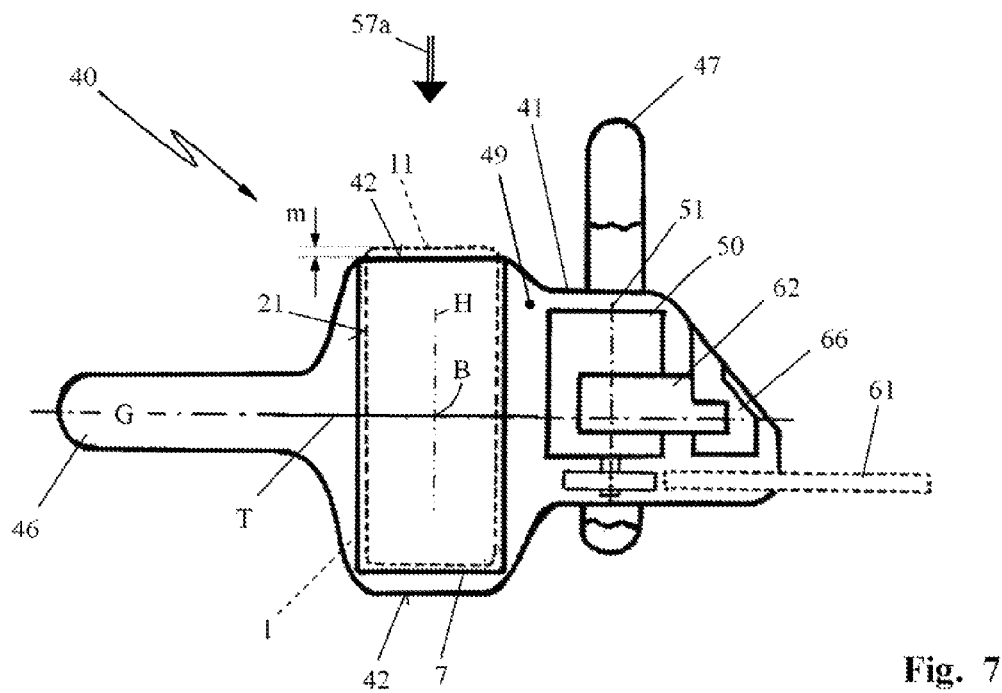
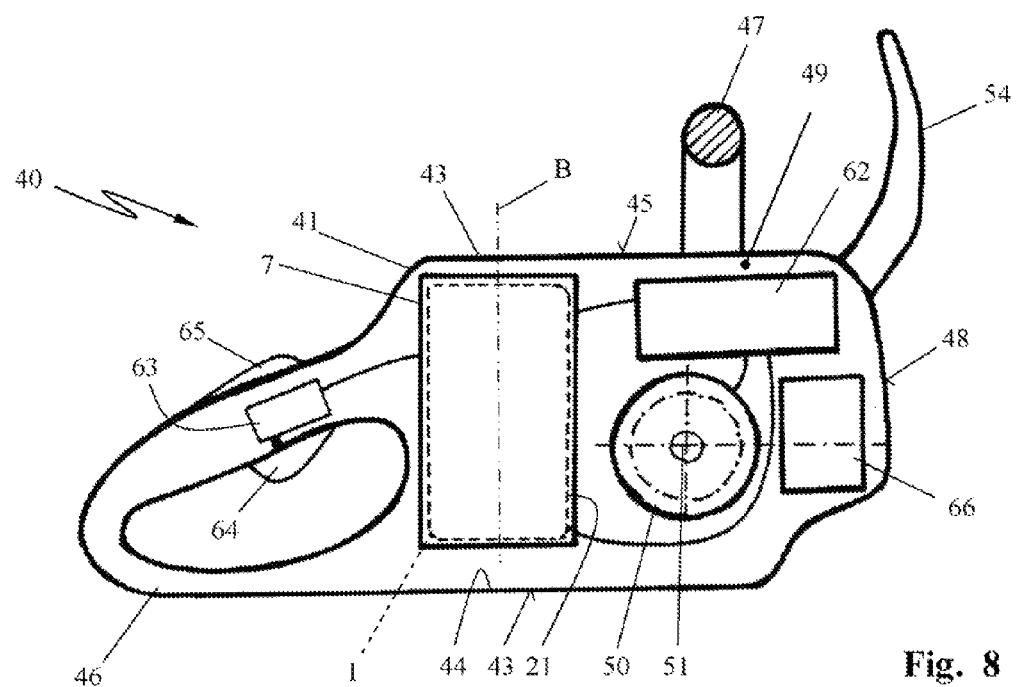

ELECTRIC POWER TOOL WITH BATTERY PACK

BACKGROUND OF THE INVENTION

The invention relates to an electric power tool, in particular a portable, hand-guided power tool such as a hedge trimmer, a motor chainsaw or the like, comprising a device housing that has a rear grip extending in the direction of the longitudinal axis of the device housing as well as a housing bottom and housing sides, wherein in the device housing an electric drive motor as well as an electronic control for operating the drive motor are received. The power tool has a battery pack compartment arranged in the device housing for receiving a battery pack, wherein the battery pack has an approximately parallelepipedal shape. The battery pack housing extends in all three orthogonal spatial directions in the direction of a height axis, a width axis and a depth axis.

Such electric power tools are known. In the device housing of the electric power tool a battery pack compartment is provided for receiving a battery pack. Such a battery pack has usually a parallelepipedal shape and is received partially in the battery pack compartment so that the device housing of the power tool is of a bulky shape because of the externally attached or only partially inserted battery pack; therefore, handling of the power tool is made difficult.

SUMMARY OF THE INVENTION

It is an object of the present invention to develop an electric power tool such that the battery pack inserted for operation of the power tool and the dimensions of the power tool are matched to one another such that handling of the electric power tool is not impair.

In accordance with the present invention, this is achieved in that the battery pack is received in such a way in the battery pack compartment that its width axis and its height extend transversely to the longitudinal axis of the device housing, wherein the narrow sides of the battery pack extend approximately parallel and at a minimal spacing relative to first housing sides of the power tool and in that the end faces of the battery pack are positioned adjacent to second housing sides.

By aligning the battery pack with its width axis transversely to the longitudinal axis of the device housing it is achieved that the smallest spatial expansion of the battery pack extends in the direction of the longitudinal axis of the device housing. In this way, the structural length of an electric power tool can be kept short so that guiding and handling of the power tool are facilitated.

In particular in case of motor chain saws, the arrangement of the battery pack in accordance with the present invention provides for a short length so that as a result of the short leverage the feeding force that is applied by the operator cannot become too great; in this way, the risk of blockage of the cutting tool during cutting action is reduced.

In a configuration where the height axis is standing on the housing bottom of the power tool, substantially the entire height of the power tool is utilized in order to accommodate the battery pack.

In a special embodiment of the present invention, the long narrow sides of the battery pack are neighboring immediately the lateral longitudinal housing sides of the device housing and the end faces of the battery pack are positioned adjacent to the housing bottom and the housing top side, respectively.

Expediently, the battery pack has a height that is greater than its width; also, the width is greater than the depth of the battery pack. Expedient sizes result when the height of the battery pack is approximately 1.2 times to 2.5 times its width and when the width of the battery pack is approximately 1.2 times to 2.5 times its depth.

The arrangement of the battery pack in the housing of the power tool is selected such that the height axis of the battery pack intercepts the longitudinal axis of the device housing of the power tool, when viewed in plan view. In this connection, the height axis of the battery pack and the axis of rotation of the drive motor expediently are positioned in a common plane in which preferably also the longitudinal axis of the device housing is positioned. With such a constructive positioning an excellent weight distribution is provided while a maximum spatial utilization for the battery pack is enabled.

Preferably, one end face of the battery pack forms part of a housing side of the device housing wherein this end face of the battery pack is provided with display and/or actuating means by means of which the operator can read or retrieve information.

It has been found to be expedient when the height axis of the battery pack is tilted in the direction of the longitudinal axis of the device housing at an angle to the front or to the rear of the power tool. Such an angle can be approximately 2° to 20°), preferably approximately 10° to 15°.

In order to ensure easy insertion of the battery pack, the wide side of the battery pack that is facing away from the rear grip determines a plane that is positioned at a spacing relative to the front grip.

BRIEF DESCRIPTION OF THE DRAWING

FIG. 7 is a plan view onto an electric power tool according to FIG. 5.

FIG. 8 is a schematic side view of a motor chain saw according to FIG. 7.

DESCRIPTION OF THE PREFERRED EMBODIMENTS

Figure 1:
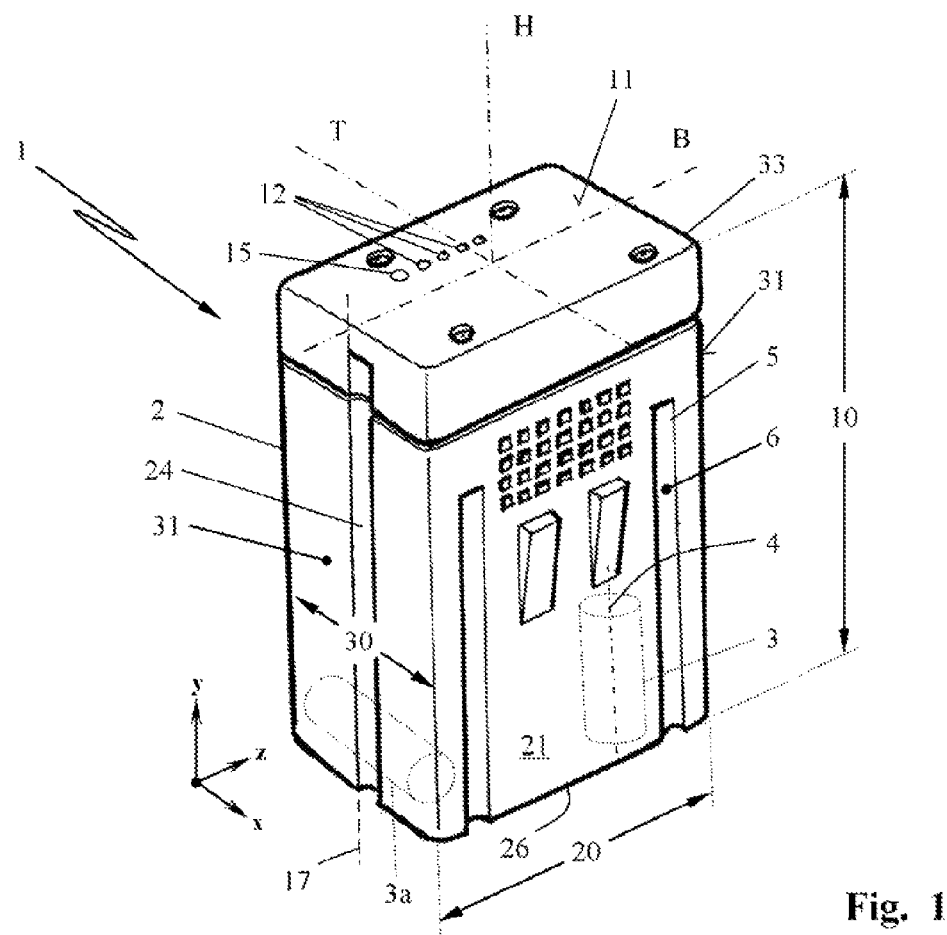
FIG. 1 is a perspective illustration of a battery pack.

The battery pack 1 illustrated in FIG. 1 is comprised of a cup-shaped battery pack housing 2 that is closed off by a cover 33. The battery pack 1 serves as an energy source for an electric power tool, in particular for a hand-guided power tool such as a motor chain saw, a hedge trimmer, a cut-off machine, a brush or grass trimmer, an edger, a pole pruner, a blower, a sprayer, a vacuuming device, an earth auger, a multi-task power tool for multi-functional attachments, a sweeper, a rotary hoe, a rototiller (cultivator), a high-pressure cleaning device, a lawnmower, a dethatcher, a chopper or shredder, a wet/dry vacuuming device, or a similar power tool that is preferably portable. The illustrated battery pack 1 has an approximately parallelepipedal basic shape that extends in the orthogonal spatial directions x, y, and z. Thus, the battery pack 1 has a height axis H, a width axis B, and a depth axis T. The height 10 in the direction of the height axis H is embodied such that it is greater than the width 20 in the direction of the width axis B. Preferably, the height 10 of the battery pack 1 is approximately 1.2 times to 2.5 times the width 20, preferably approximately 1.4 times the width 20. Expediently, the battery pack 1 has a height 10 of approximately 160 mm and a width 20 of approximately 115 mm.

The battery pack has moreover a width 20 that is approximately 1.2 times to 2.5 times the depth 30 in the direction of the depth axis T. Preferably, the width 20 of the battery pack 1 is designed such that it corresponds approximately to 1.7 times the depth 30. In the embodiment illustrated here, the battery pack 1 has a depth 30 of approximately 67 mm.

In the battery pack housing 2 of the battery pack 1 a plurality of battery cells 3 are arranged wherein in one embodiment the cylinder axes 4 of the preferably cylindrically embodied battery cells 3 extend in the direction of the height axis H. The cylinder axes 4 of the battery sells 3 are positioned parallel to the height axis H. In an alternative embodiment, the battery cells 3 can be arranged horizontally so that their longitudinal axis is approximately parallel to the bottom 26 of the battery pack housing 2. The illustrated cylindrical shape of the battery cells is to be understood only as an example. Other cross-sectional shapes such as parallelepipedal shapes or the like or a configuration as flat battery cells may also be advantageous.

In the battery pack housing 2 of the battery pack 1, preferably a first layer comprising several battery cells 3 are arranged adjacent to one another in upright position. In a second layer that follows the first layer in the direction of the height axis H, further battery cells 3 are provided. The battery cells are rechargeable cells, for example, battery cells such as a NiCd cell (nickel cadmium cell), an NiMH cell (nickel metal hydride cell), a Li-ion cell (lithium ion cell), a LiPo cell (lithium polymer cell), a LiFePO4 cell (lithium iron phosphate cell), a lithium titanate cell or a battery cell of a similar build. In particular, battery cells on the basis of lithium are expedient that have cell voltages of 2 to 5 volts, preferably 3.6 to 3.7 volts.

With an appropriate electric connection (serial connection, parallel connection), battery pack voltages of preferably 25 volts to 50 volts, for example, 36 colts or 42 volts, can be made available by employing the aforementioned cells. Depending on the embodied circuit, battery package voltages of 12 volts to 150 volts are possible. The power of such a battery pack 1 is preferably in the range of 2 Ah to 10 Ah.

The battery pack 1 illustrated in FIG. 1 has two wide sides 21 that extend parallel to the plane that is defined by the height axis H and the width axis B, i.e., in the direction of the y-z plane. The long narrow sides 31 of the battery pack 1 extend parallel to the plane that is defined by the height axis H and the depth axis T, in the y-x plane.

The end faces 11 of the battery pack extend parallel to the plane that is defined by the width axis B and the depth axis T, i.e., in the x-z plane.

Figure 2:
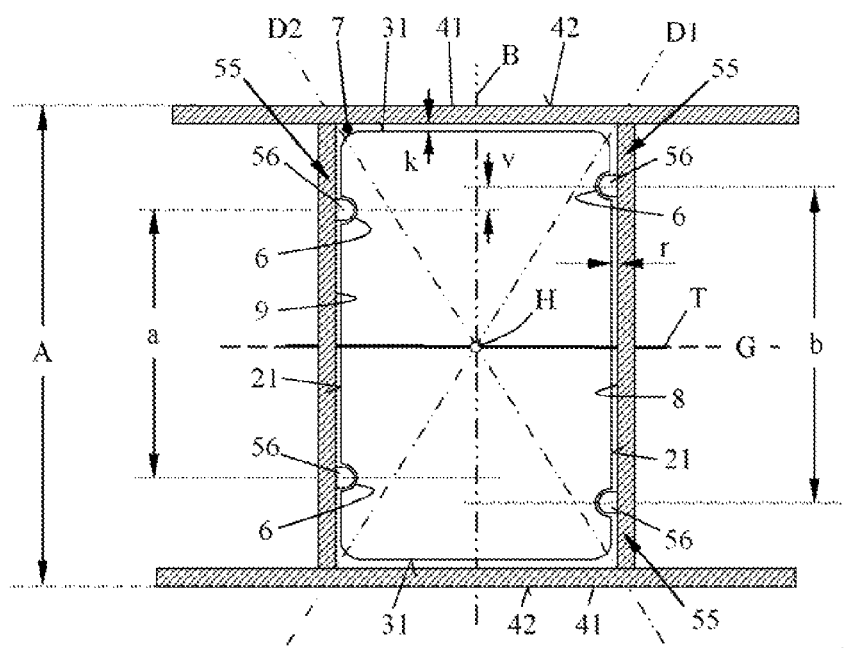
FIG. 2 is a schematic illustration of a battery pack according to FIG. 1 inserted into a battery pack compartment of the device housing.

In the embodiment according to FIG. 1, the wide sides 21 are provided each with two guide sections 5 in the form of guide grooves 6 that interact with guide means 55 in the battery pack compartment 7 of the device housing 41 (FIG. 2). The guide means 55 that extend in the direction of the height axis H are embodied in the illustrated embodiment as guide ribs 56 that engage the guide grooves 6 that extend also in the direction of the height axis H. As shown in FIG. 2, on the oppositely positioned wide sides 8 and 9 of the battery pack compartment 7 two guide means 55 in the form of guide ribs 56 are arranged, respectively, wherein the guide ribs 56 on a first wide side 8 are displaced relative to the guide ribs 56 on the second wide side 7 by a spacing v in the direction of the width axis B. Preferably, the guide ribs 56 on the first wide side 8 of the battery pack compartment 7 have a spacing b relative to one another that is greater than a spacing a of the guide ribs 56 on the opposite wide side 9. The arrangement is such that the spacing a is located within the spacing b (FIG. 2).

The long narrow sides 31 of the battery pack 1 are provided with additional guide grooves 24 that extend in the direction of the height axis H and serve for position-precise arrangement in a recharging device, not illustrated. A single guide groove 24 extends on a narrow side 31 from the bottom 26 into the housing cover 33 of the battery pack 1 wherein the guide groove 24 is positioned off-center relative to a central axis 17 of the narrow side 31.

Figure 3:
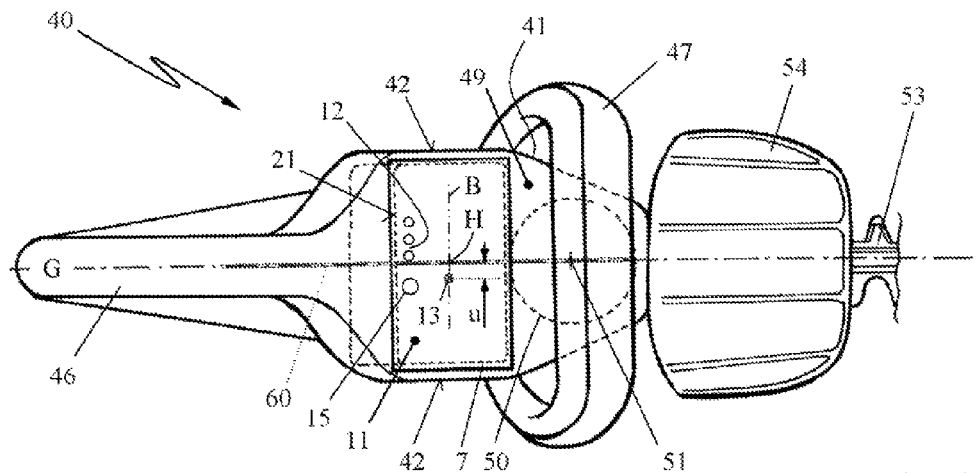
FIG. 3 is a plan view onto an electric power tool that is embodied as a hedge trimmer.

As shown in the embodiment according to FIG. 3, the power tool 40 has a device housing 41 that has housing sides 42 that extend parallel to the longitudinal axis G of the device housing and form lateral longitudinal sides of the device housing. Moreover, the device housing 41 has upper and lower housing sides 43 wherein the lower housing side 43 forms the housing bottom 44. The upper housing side 44 forms the housing top side 45.

The device housing 41 has a rear grip 46 that extends in the direction of longitudinal axis G of the device housing. Moreover, a front grip 47 is provided that spans the device housing 41 and is positioned above a drive motor 50 that is arranged within the device housing 41. The battery pack compartment 7 is positioned between the rear grip 46 and the electric drive motor 50 arranged in the device housing 41. The inner partitioning of the device housing 41 is such that between the battery pack compartment 7 and the front end face 48 a housing chamber 49 is provided that receives the drive motor 50, an electronic control for the drive motor and optionally an operating medium tank. The position of the battery pack compartment 7, is such that the wide side 21 facing the drive motor 50 has a spacing z relative to the front grip 47.

Figure 4:
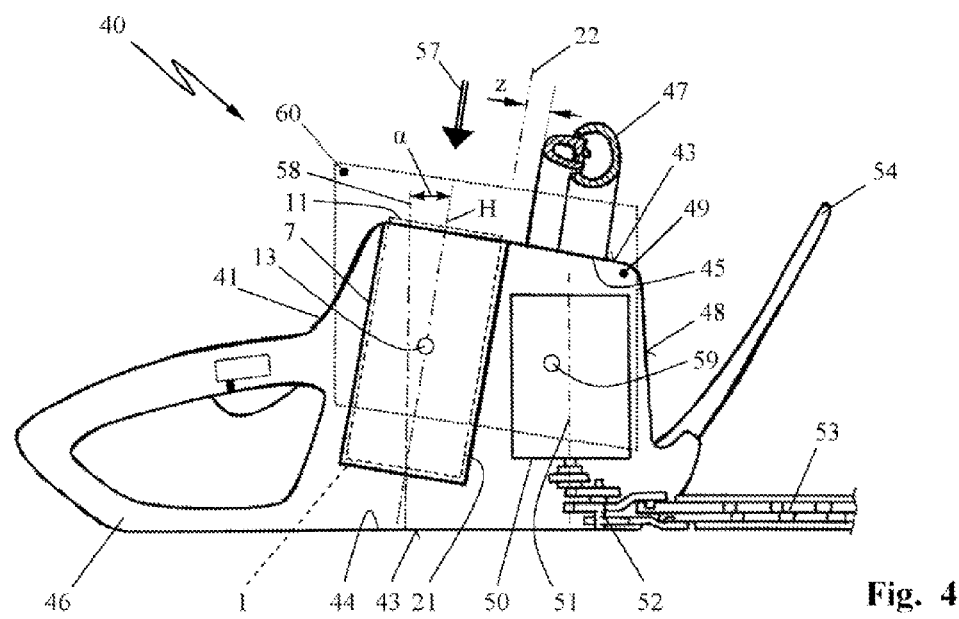
FIG. 4 is a schematic side view of the hedge trimmer according to FIG. 3.

In the embodiment according to FIGS. 3 and 4 a hedge trimmer is shown whose drive motor is arranged upright. The axis of rotation 51 of the drive motor is upright relative to the housing bottom 44 and drives an eccentric gear 52 for driving the blades of a cutter bar 53 of the hedge trimmer.

Between the front end face 48 of the power tool 40 and the cutter bar 53 a hand guard 54 is arranged.

In the embodiment according to FIGS. 3 and 4, the parallelepipedal battery pack 1 is inserted from above in insertion direction 57 in the direction toward the housing bottom 44 into the battery pack compartment 7. The rotary position of the battery pack 1 about the height axis H is predetermined by the guide sections 5 on the battery pack 1 as well as the guide means 55 in the battery pack compartment 7. As shown in FIG. 2, in plan view onto the top end face 11 that is provided, as shown in FIG. 1, with display means 12 and operating means 15, the depth axis T is parallel to the longitudinal axis G of the device housing. Preferably, the depth axis T in plan view of FIG. 2 is congruent with the longitudinal axis G. The battery pack 1 is received in such a way in the battery pack compartment 7 that its depth axis B extends transverse to the longitudinal axis G of the device housing and its height axis H stands on the housing bottom 44 (FIG. 4). The dimensions are such that the narrow sides 31 of the battery pack 1 are positioned approximately parallel and at a minimal spacing k relative to the first housing sides 42 that in the embodiment according to FIGS. 3 and 4 are the lateral longitudinal sides of the device housing. The spacing k is preferably in the range of 2 mm to 15 mm, preferably at a location of greatest spacing is approximately 9 mm. The end faces 11 of the battery pack 1, as shown in FIG. 4, are positioned adjacent to further housing sides 43 that in the illustrated embodiment are formed by the housing bottom 44 and the housing top side 45. The first housing sides 42 (longitudinal sides of the device housing) and the second housing sides 43 (housing bottom 44, housing top side 45) are positioned such that neighboring ones are approximately orthogonal relative to one another. The wide sides 21 of the battery pack 1 are positioned at a spacing r of approximately 0.5 mm to 4 mm, preferably at a maximum spacing r of 2.1 mm relative to the inner wall of the battery pack compartment 7 (FIG. 2).

According to the embodiment of FIGS. 3 and 4, the arrangement is such that the height axis H in plan view according to FIGS. 2 and 3 or in plan view onto the end face 11 with the display means 12 and actuating means 15 intercepts the longitudinal axis G of the device housing of the power tool 40. The longitudinal axis G is preferably the longitudinal center axis of the power tool 40.

The position of the battery pack 1, its mounting orientation in the device housing 41 of the power tool 40, and the drive motor 50 arranged in the device housing 41 are oriented relative to one another such that the height axis H of the battery pack 1 and the axis of rotation 51 of the drive motor 50 define a common plane 60. The common plane 60 is preferably perpendicular to the housing bottom 44 and forms approximately a symmetry plane in the longitudinal direction of the power tool 40.

In a preferred embodiment the longitudinal axis G of the device housing is preferably also positioned in the plane 60.

The insertion position of the battery pack 1 in the battery pack compartment 7 is such that in the insertion direction 57 the rear end face 11 with the display means 12 and actuating means 15 closes off the battery pack compartment 7 and forms a part of the housing side 43. In the illustrated embodiment the end face 11 with the display and/or actuating means 12, 15 forms a part of the housing top side 45. In this way, the display means 12 and actuating means 15 arranged in the end face 11 forming part of the housing top side 44 are easily recognizable by the operator and easily accessible.

In the embodiment according to FIGS. 3 and 4 the height axis H of the battery pack 1 is tilted relative to a perpendicular 58 standing on the housing bottom 44. In the illustrated embodiment, the height axis H of the battery pack 1 is tilted forward in the direction of the longitudinal axis G of the device housing at an angle α. The angle α is approximately 2° to 20°, preferably approximately 15°. The slant of the height axis H in the direction of the front end face 48 is such that a plane 22 has a spacing z relative to the front grip 47; the plane 22 is defined by the wide side 21 of the battery pack 1 that is facing the drive motor 50.

The height axis H of the battery pack 1 is determined precisely with respect to its position (FIG. 2) by the point of intersection of the diagonals D1 and D2 of the end faces 11

The constructive position of the battery pack 1 that is determined by the configuration and shape of the battery pack compartment 7 in the device housing 41 is selected expediently such that the center of gravity 13 of the battery pack 1 is positioned at a minimal lateral spacing u relative to the plane 60 that is defined by the height axis H and the longitudinal axis G of the device housing. The spacing u is approximately 0.02 mm to 0.2 mm.

The center of gravity 59 of the device housing 41 with the drive motor 50, electronic control and preferably the operating medium tank arranged therein is positioned preferably in the plane 60 that is defined by the height axis H of the device housing and the longitudinal axis G of the device housing. A minimal spacing from the plane 60 may be expedient.

Figure 5:
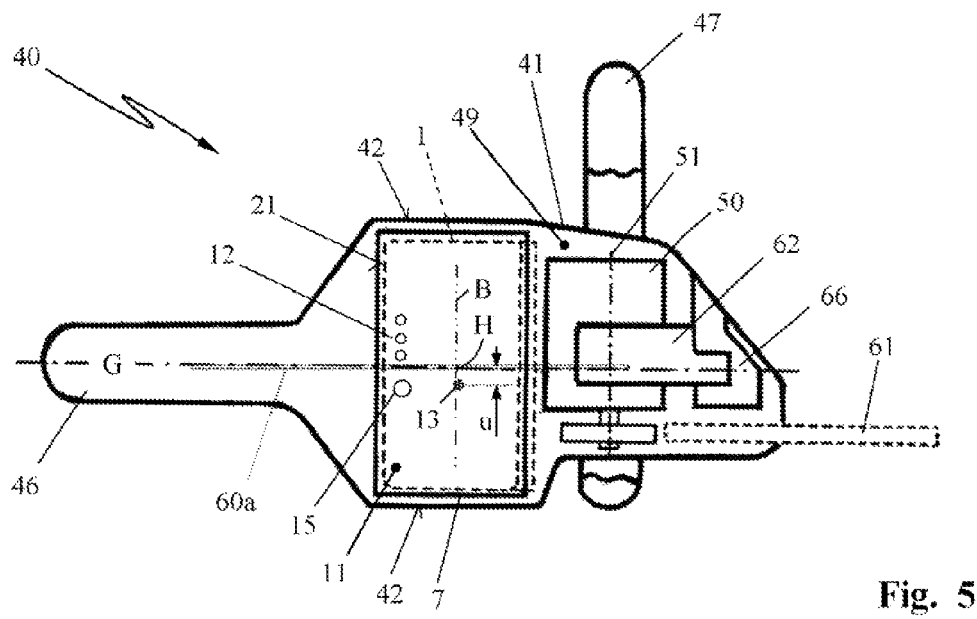
FIG. 5 is a schematic illustration of plan view onto an electric power tool in the form of a motor chain saw.
Figure 6:
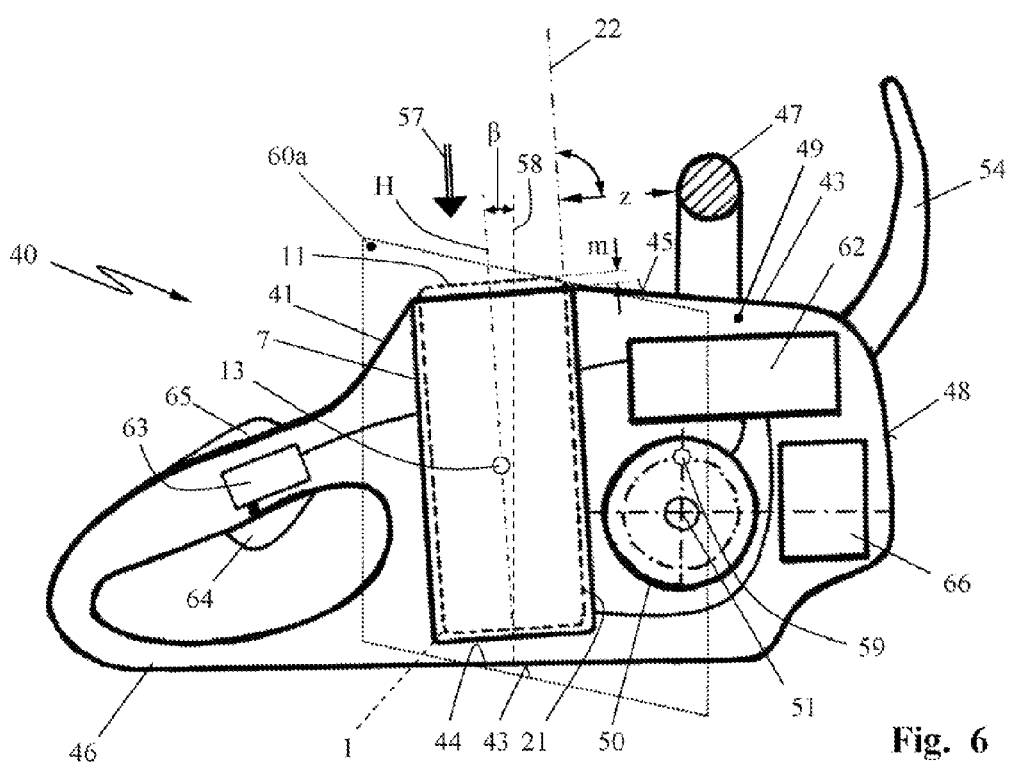
FIG. 6 is a schematic side view of the motor chain saw according to FIG. 5.

In the embodiment according to FIGS. 5 and 6 the illustrated power tool 40 is a motor chain saw. The schematic basic configuration of the power tool 40 corresponds to that of FIGS. 3 and 4 so that same parts are identified by the same reference numerals.

In deviation from the embodiment of a hedge trimmer according to FIGS. 3 and 4 the drive motor 50 is arranged horizontally so that its axis of rotation 51 is approximately perpendicular to the plane 60a that is defined by the longitudinal axis G of the device housing and the height axis H of the battery pack 1. The insertion of the battery pack 1 into the battery pack compartment 7 is also done in insertion direction 57 from above. The battery pack 1 is inserted so far into the battery pack compartment 7 that its upper end face 11 with the display means 12 and actuating means 15 forms approximately the top side 45 of the device housing. A possible upward projection m is selected such that the harmonious appearance of the housing top side 45 is not disturbed.

The selected arrangement of the battery pack 1 in the device housing 41 of the power tool, in the illustrated embodiment a hedge trimmer, provides an advantageous power tool balance about the front grip 47.

In the embodiment according to FIGS. 5 and 6, a portable hand-guided power tool is exemplified by a motor chain saw. The battery pack 1 is tilted relative to the perpendicular 58 standing on the housing bottom 44 by an angle β to the rear, i.e., is tilted toward the rear grip 46. The tilt angle is preferably 2° to 20° and in the illustrated embodiment it is 10°.

The arrangement of the battery pack 1 with its width axis B transverse to the longitudinal axis G of the device housing of the power tool 40 provides a beneficial short length of the power tool so that in case of a motor chainsaw, as a result of the structurally provided short leverage, the feeding forces applied by the operator cannot become too large; in this way, the blockage risk as a whole is reduced.

In the housing chamber 49 between the battery pack compartment 7 and the front end face 48, an electronic control 62 is arranged adjacent to the electric motor 50 and the output for the cutting device 61; the electronic control 62 is connected to the battery pack 1, the drive motor 50 as well as an actuating switch 63. The actuating switch 63 is actuated by a throttle lever 64 supported in the rear grip 46 that can be operated when the lever lock 65 is suppressed. In addition to the electronic control 62 in the housing chamber 49 also an operating medium tank 66 is provided that contains, for example, chain oil for lubricating a saw chain circulating about a guide bar.

The center of gravity 13 of the battery pack 1 is positioned at a minimal lateral spacing u relative to the plane 60 that is defined by the height axis H and the longitudinal axis G of the device housing. The spacing u is approximately 0.02 mm to 0.2 mm.

The center of gravity 59 of the device housing 41 with assemblies arranged therein is selected such that is located advantageously in the plane 60a that is defined by the height axis H of the battery pack 1 and the longitudinal axis G of the device housing. A minimal spacing from the plane 60a may be expedient.

In the embodiment according to FIGS. 5 and 6, the longitudinal axis G of the device housing is substantially a longitudinal center axis of the device housing.

The embodiment according to FIGS. 7 and 8 corresponds substantially to that of FIGS. 5 and 6 so that for same parts the same reference numerals are used.

In deviation from the embodiment according to FIGS. 5 and 6, in the embodiment according to FIGS. 7 and 8 the battery pack 1 is inserted laterally into the device housing 41 of the power tool 40, embodied in the illustrated embodiment as a motor chain saw. As shown in FIG. 7 the battery pack 1 is inserted from a lateral longitudinal side 67 of the device housing 41 into the compartment 7; the lateral longitudinal side 67 extends substantially parallel to the longitudinal axis G of the device housing. In this arrangement, the height axis H is approximately parallel to the housing bottom 44 wherein the width axis B is approximately perpendicular to the housing bottom 44. The depth axis T, in plan view of FIG. 7, is parallel to the longitudinal axis G and is preferably congruent with the longitudinal axis G.

The battery pack 1 is inserted so far into the battery pack compartment 7 that its end face 11 with the display means and actuating means approximately forms the lateral longitudinal housing side 42 of the device housing. A possible lateral projection m is selected such that the harmonious appearance of the housing side 42 is not disturbed.

It can be advantageous to arrange in the device housing of the power tool the battery pack in such a way that its width axis extends in the direction of the longitudinal axis of the device housing of the power tool, for example, parallel to or so as to coincide with the longitudinal axis of the device housing. In this way a particularly narrow configuration is obtained which is advantageous for working in tight spaces, for example, when delimbing trees.

The specification incorporates by reference the entire disclosure of German priority document 10 2009 012 175.7 having a filing date of Feb. 27, 2009.

While specific embodiments of the invention have been shown and described in detail to illustrate the inventive principles, it will be understood that the invention may be embodied otherwise without departing from such principles.

What is claimed is:

1. An electric power tool comprising:
   a device housing comprising a front end where a tool member is disposed and comprising a rear grip opposite the front end, wherein a longitudinal axis of the device housing extends from the front end to the rear grip and the rear grip extends in a direction of said longitudinal axis of said device housing, said device housing further comprising first and second opposed lateral sides and a housing top side and a housing bottom;
   an electric drive motor arranged in said device housing;
   an electronic control arranged in said device housing and connected to said electric drive motor for operating said electric drive motor;
   a battery pack compartment arranged inside said device housing;
   a battery pack arranged in said battery pack compartment, wherein said battery pack has a battery pack housing of an approximately parallelepipedal shape and said battery pack housing extends in all three orthogonal spatial directions in a direction of a height axis of said battery pack housing, in a direction of a width axis of said battery pack housing, and in a direction of a depth axis of said battery pack housing;
   wherein said battery pack has a height measured in said direction of said height axis, a width measured in said direction of said width axis, and a depth measured in said direction of said depth axis, wherein said height of said battery pack is 1.2 times to 2.5 times greater than said width and wherein said width of said battery pack is 1.2 times to 2.5 times greater than said depth;
   wherein said battery pack housing has two opposed narrow sides, a first wide side connecting first ends of the narrow sides and a second wide side connecting second ends of the narrows sides, and opposed end faces connected to said narrow sides and said wide sides, respectively;
   wherein, in said direction of said longitudinal axis of said device housing, said battery pack compartment is positioned between said rear grip and said electric drive motor such that said first wide side faces said electric drive motor and faces away from said rear grip and said second wide side faces away from said electric drive motor and faces said rear grip;
   said battery pack housing received in said battery pack compartment such that said width axis extends transversely to said longitudinal axis of said device housing and said depth axis extends in said direction of said longitudinal axis of said device housing;
   wherein said narrow sides extend approximately parallel to said lateral sides, wherein said narrow sides are positioned at a minimal spacing relative to said lateral sides of said device housing, respectively, wherein said minimal spacing is in a range of 2 mm to 15 mm;
   wherein said opposed end faces are positioned so as to neighbor said housing top side and said housing bottom, respectively;
   wherein said device housing has a device housing height measured at said battery pack compartment from said housing bottom to a highest point of said housing top side;
   wherein said device housing has a device housing width measured at said battery pack compartment from said first opposed lateral side to said second opposed lateral side;
   wherein said device housing height and said device housing width of the electric power tool are utilized to accommodate said battery pack.

2. The electric power tool according to claim 1, wherein said height axis of said battery pack housing is standing on said housing bottom of said device housing.

3. The electric power tool according to claim 2, wherein said narrow sides of said battery pack are positioned immediately adjacent to said lateral sides of said device housing.

4. The electric power tool according to claim 2, wherein said height axis of said battery pack housing is tilted relative to a perpendicular standing on said housing bottom.

5. The electric power tool according to claim 2, wherein said height axis of said battery pack housing is tilted at an angle forwardly or rearwardly in a direction of said longitudinal axis of said device housing.

6. The electric power tool according to claim 5, wherein said angle is approximately 2° to 20°.

7. The electric power tool according to claim 6, wherein said angle is approximately 10° to 15°.

8. The electric power tool according to claim 2, wherein the center of gravity of said battery pack is positioned at a minimal lateral spacing relative to a plane that is defined by said height axis of said battery pack housing and said longitudinal axis of said device housing.

9. The electric power tool according to claim 1, wherein said height of said battery pack is approximately 1.4 times said width.

10. The electric power tool according to claim 1, wherein said width of said battery pack is approximately 1.7 times said depth.

11. The electric power tool according to claim 1, wherein said battery pack contains approximately cylindrical battery cells that have a cylinder axis that is substantially parallel to said height axis of said battery pack housing.

12. The electric power tool according to claim 1, wherein said height axis of said battery pack housing intercepts said longitudinal axis of said device housing.

13. The electric power tool according to claim 1, wherein said height axis of said battery pack housing and an axis of rotation of said drive motor define a common plane.

14. The electric power tool according to claim 13, wherein said longitudinal axis of said device housing is positioned in said common plane.

15. The electric power tool according to claim 1, wherein a first one of said opposed end faces of said battery pack housing forms a part of said housing top side.

16. The electric power tool according to claim 15, wherein said battery pack comprises at least one operating device selected from a display element or an actuating element, wherein said at least one operating device is arranged in said first opposed end face.

17. The electric power tool according to claim 1, wherein said device housing has a housing chamber that is located between said battery pack compartment and a front end face of said device housing, wherein said drive motor and said electronic control are arranged in said housing chamber.

18. The electric power tool according to claim 17, wherein an operating medium tank is arranged in said housing chamber.

19. The electric power tool according to claim 1, wherein said wide side that is facing away from said rear grip defines a plane that is positioned at a spacing from a front grip.

20. The electric power tool according to claim 19, wherein said front grip spans said device housing approximately at a location where said drive motor is arranged.

21. The electric powertool according to claim 1, wherein said height axis of said battery pack housing is approximately parallel to a housing bottom of said device housing.

22. The electric power tool according to claim 1, wherein said minimal spacing relative to said lateral sides of said device housing is approximately 9 mm.

23. The electric power tool according to claim 1, wherein said device housing height and said device housing width of the electric power tool accommodate said battery pack at maximum spatial utilization of an interior space of said device housing defined by said device housing height and said device housing width.

* * * * *